(12) United States Patent
Murakami et al.

(10) Patent No.: US 11,118,007 B2
(45) Date of Patent: Sep. 14, 2021

(54) CRYSTALLINE POLYESTER RESIN AND FLAME-RETARDANT SEALING RESIN COMPOSITION

(71) Applicant: TOYOBO CO., LTD., Osaka (JP)

(72) Inventors: Yuki Murakami, Shiga (JP); Ryo Hamasaki, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 259 days.

(21) Appl. No.: 16/305,488

(22) PCT Filed: Sep. 11, 2017

(86) PCT No.: PCT/JP2017/032647
§ 371 (c)(1),
(2) Date: Nov. 29, 2018

(87) PCT Pub. No.: WO2018/061730
PCT Pub. Date: Apr. 5, 2018

(65) Prior Publication Data
US 2020/0325272 A1    Oct. 15, 2020

(30) Foreign Application Priority Data

Sep. 29, 2016  (JP) ............................. JP2016-191081
Sep. 29, 2016  (JP) ............................. JP2016-191082

(51) Int. Cl.
| | | |
|---|---|---|
| C08G 63/553 | (2006.01) | |
| C08G 63/676 | (2006.01) | |
| C08G 63/199 | (2006.01) | |
| C08G 63/672 | (2006.01) | |
| C08K 5/521 | (2006.01) | |
| C08K 3/10 | (2018.01) | |
| C08K 5/5313 | (2006.01) | |
| C09K 3/10 | (2006.01) | |
| C09K 21/12 | (2006.01) | |

(52) U.S. Cl.
CPC ......... *C08G 63/676* (2013.01); *C08G 63/199* (2013.01); *C08G 63/553* (2013.01); *C08G 63/672* (2013.01); *C08K 5/521* (2013.01); *C08K 5/5313* (2013.01); *C09K 3/10* (2013.01); *C09K 21/12* (2013.01); *C08G 2190/00* (2013.01); *C09K 2003/1078* (2013.01); *C09K 2200/0417* (2013.01); *C09K 2200/0655* (2013.01)

(58) Field of Classification Search
CPC .. C08G 63/676; C08G 63/199; C08G 63/553; C08G 63/672; C08G 2190/00; C08K 5/521; C08K 5/5313; C08K 3/10; C08K 21/12; C08K 2003/1078; C08K 2200/0417; C08K 2200/0655
USPC .......................................... 542/133; 524/133
See application file for complete search history.

(56) References Cited

U.S. PATENT DOCUMENTS

| | | |
|---|---|---|
| 9,080,091 B2 | 7/2015 | Sakai et al. |
| 2015/0322258 A1 | 11/2015 | Watanabe et al. |

FOREIGN PATENT DOCUMENTS

| | | | |
|---|---|---|---|
| JP | 4-255753 | | 9/1992 |
| JP | 5-209044 | | 8/1993 |
| JP | 05209044 | A * | 8/1993 |
| JP | 6-287285 | | 10/1994 |
| JP | 6-301148 | | 10/1994 |
| JP | 06287285 | A * | 10/1994 |
| JP | 2003-253086 | | 9/2003 |
| JP | 2012-67176 | | 4/2012 |
| JP | 2012-246375 | | 12/2012 |
| WO | 2012/124435 | | 9/2012 |
| WO | 2014/034474 | | 3/2014 |

OTHER PUBLICATIONS

Extended European Search Report dated Dec. 4, 2019 in corresponding European Patent Application No. 17855687.4.
International Search Report dated Nov. 14, 2017 in International Application No. PCT/JP2017/032647.

* cited by examiner

*Primary Examiner* — Kelechi C Egwim
(74) *Attorney, Agent, or Firm* — Wenderoth, Lind & Ponack, L.L.P.

(57) ABSTRACT

The present invention aims to provide a crystalline polyester resin which satisfies both of a high melting point and a high fluidity, and a flame-retardant sealing resin composition using the same. A crystalline polyester resin (A) containing polycarboxylic acid components and polyhydric alcohol components as copolymerizing components, characterized in that a copolymerizing rate of a 2,6-naphthalenedicarboxylic acid component is from 40 to 100 molar % when a total of the polycarboxylic acid components in the crystalline polyester resin (A) is taken as 100 molar %, that a 1,4-butanediol component is copolymerized as a polyhydric alcohol component, and that a copolymerizing rate of the 1,4-butanediol component is 40 molar % or less when a total of the polyhydric alcohol components is taken as 100 molar %.

7 Claims, 1 Drawing Sheet

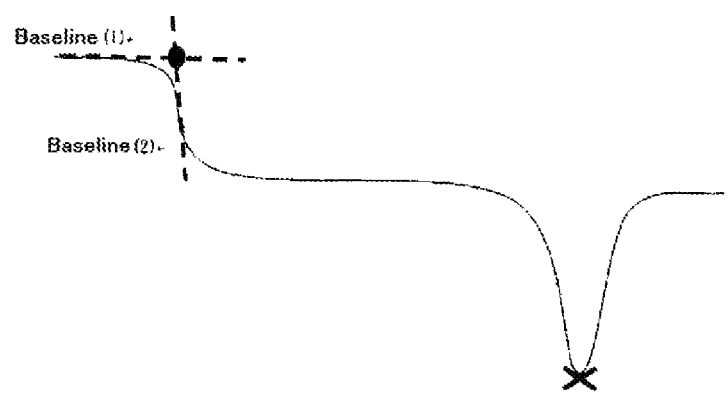

CRYSTALLINE POLYESTER RESIN AND FLAME-RETARDANT SEALING RESIN COMPOSITION

TECHNICAL FIELD OF THE INVENTION

The present invention relates to a crystalline polyester resin and also to a flame-retardant sealing resin composition using the crystalline polyester resin.

BACKGROUND ART

A thermoplastic hotmelt material lowers its viscosity by being heated and melted up to a melting point or higher. The thermoplastic hotmelt material does not contain any solvent and is excellent in its initial adhesive force. Accordingly, it is excellent in terms of a working environment and a productivity and has been widely utilized in various fields. As to a use of the hotmelt material as above, there are exemplified mold sealing uses for electric/electronic parts being used in automobiles and electric appliances. Sealing of the electric/electronic parts with the hotmelt material is not only very important in view of a retention of an electric insulating property to an outside, a waterproofing property and a dustproofing property but also results in a simplification of steps and in a reduction of costs. Particularly in a case of sealing the electric/electronic parts having complicated shapes such as circuit substrates, the hotmelt material having good fluidity has been preferred in view of a sure following to the shapes of the electric/electronic parts so as to avoid a generation of non-filled portions, a reduction of damages to the electric/electronic parts and a production takt. On the other hand, a heat resistance is demanded as a sealing agent in view of a keeping of an environmental reliability of the electric/electronic parts. Accordingly, it is necessary for the hotmelt material to have the melting point of a certain temperature or higher.

Due to the background as mentioned above, there has been demanded a thermoplastic hotmelt material which satisfies both of a high melting point and a high fluidity. As to an example which aims to satisfy both of the high melting point and the high fluidity, there has been known a thermoplastic hotmelt material which contains an ethylene copolymer resin as a main component and which uses wax for improving a viscosity characteristic at low temperatures (Patent Document 1). As to other hotmelt material, there is an example which uses a polyamide hotmelt material (Patent Document 2).

PRIOR ART DOCUMENTS

Patent Documents

Patent Document 1: Japanese Patent Application Laid-Open (JP-A) No. 2012-246375
Patent Document 2: Japanese Patent Application Laid-Open (JP-A) No. 2012-67176

DISCLOSURE OF THE INVENTION

Problem that the Invention is to Solve

However, in the wax mentioned in Patent Document 1, there are problems such as an anxiety of a bleeding-out in a long-term storage and a decrease in a heat resistance at a melting point of the wax or higher. In the polyamide mentioned in Patent Document 2, there are problems of not only that a handling property such as a moisture control during molding is difficult due to its high water absorption but also that an adhesive property lowers under a moist heat environment.

The present invention has been achieved under the background of such problems in the prior art. Thus, an object of the present invention is to provide a crystalline polyester resin (A) which satisfies both of the high melting point and the high fluidity, and to provide a flame-retardant sealing resin composition using the same.

Means for Solving the Problem

As a result of extensive investigations, the inventors have found that the above problems can be solved by the means shown below and achieved the present invention. Thus, the present invention comprises the following constitutions.

A crystalline polyester resin (A) containing polycarboxylic acid components and polyhydric alcohol components as copolymerizing components, characterized in that a copolymerizing rate of a 2,6-naphthalenedicarboxylic acid component is from 40 to 100 molar % when a total of the polycarboxylic acid components in the crystalline polyester resin (A) is taken as 100 molar %, that a 1,4-butanediol component is copolymerized as a polyhydric alcohol component, and that a copolymerizing rate of the 1,4-butanediol component is 40 molar % or less when a total of the polyhydric alcohol components is taken as 100 molar %.

It is preferred that a copolymerizing rate of a 1,4-cyclohexanedimethanol component is 60 molar % or more when the total of the polyhydric alcohol components in the crystalline polyester resin (A) is taken as 100 molar %, that a number-average molecular weight is from 5,000 to 50,000 and, further, a melting point of the crystal is from 100° C. to 180° C.

A flame-retardant sealing resin composition containing the above crystalline polyester resin (A) and a flame retardant agent (B).

It is preferred that the flame retardant agent (B) is an ester of phosphoric acid or a metal salt of phosphinic acid.

It is preferred that a ratio W(A)/W(B) which is a ratio of a weight fraction W(A) of the crystalline polyester resin (A) to a weight fraction W(B) of the flame retardant agent (B) is from 3 to 20. It is preferred that a sum of the weight fraction W(A) of the crystalline polyester resin (A) and the weight fraction W(B) of the flame retardant agent (B) to a total weight of the flame-retardant sealing resin composition is from 50 to 90% by weight.

Advantages of the Invention

In accordance with the crystalline polyester resin (A) of the present invention, by optimizing a selection of monomers and copolymerizing amounts thereof, it is now possible to make a melting viscosity low while the high melting point is still maintained. In addition, the crystalline polyester resin (A) still exhibits a good fluidity even when a flame retardant agent (B) is compounded therewith and, further, it is possible to exhibit an excellent flame-retardant property. Accordingly, the crystalline polyester resin can be advantageously used particularly for sealing the electric/electronic parts.

BRIEF DESCRIPTION OF THE DRAWINGS

FIG. 1 is a schematic drawing of a chart measured by a differential scanning calorimeter.

BEST MODE FOR CARRYING OUT THE INVENTION

As hereunder, the present invention will be illustrated in detail.

<Crystalline Polyester Resin (A)>

The crystalline polyester resin (A) of the present invention contains polycarboxylic acid components and polyhydric alcohol components as copolymerizing components. It is necessary that, when a total of the polycarboxylic acid components in the crystalline polyester resin (A) is taken as 100 molar %, a 2,6-naphthalenedicarboxylic acid component is copolymerized in 40 molar % or more. It is preferred to be 50 molar % or more, more preferred to be 60 molar % or more, further preferred to be 70 molar % or more, especially preferred to be 80 molar % or more, and most preferred to be 90 molar % or more. It may also be even 100 molar %. When it is too small, a crystallinity may lower.

It is also preferred that a dimer acid component is copolymerized as the polycarboxylic acid components of the crystalline polyester resin (A). As a result of the copolymerization of the dimer acid component, it can be expected that a glass transition temperature of the crystalline polyester resin (A) lowers and accordingly a fluidity is improved. When the total of the polycarboxylic acid components is taken as 100 molar %, the copolymerizing rate of the dimer acid component is preferred to be 10 molar % or more, and more preferred to be 20 molar % or more. When it is too small, the glass transition temperature may become high and accordingly the fluidity may become low. It is also preferred to be 60 molar % or less, and more preferred to be 50 molar % or less. When it is too much, the crystallinity of the crystalline polyester resin (A) may lower.

As to other polycarboxylic acid components, a dicarboxylic acid component other than the above 2,6-naphthalenedicarboxylic acid and the dimer acid, and a trivalent or higher polycarboxylic acid component may be copolymerized.

As to the dicarboxylic acid component, there may be exemplified an aromatic dicarboxylic acid such as terephthalic acid, 1,4-naphthalenedicarboxylic acid, 1,5-naphthalenedicarboxylic acid, 4,4'-biphenyldicarboxylic acid, isophthalic acid, orthophthalic acid, diphenoxyethane-dicarboxylic acid, 4,4'-diphenyl ether dicarboxylic acid and 4,4'-diphenyl ketone dicarboxylic acid; an aliphatic dicarboxylic acid such as adipic acid, sebacic acid, succinic acid and glutaric acid; and an alicyclic dicarboxylic acid such as hexahydroterephthalic acid, hexahydroisophthalic acid, 1,2-cyclohexanedicarboxylic acid, 1,3-cyclohexanedicarboxylic acid and 1,4-cyclohexanedicarboxylic acid. Among them, terephthalic acid is preferred in view of a polymerizing ability, a cost and a crystallinity. As to the trivalent or higher polycarboxylic acid component, there may be exemplified a polycarboxylic acid such as trimellitic acid, pyromellitic acid, benzophenonetetracarboxylic acid, biphenylsulfonetetracarboxylic acid and biphenyl-tetracarboxylic acid. Each of those dicarboxylic acid components or trivalent or higher polycarboxylic acid components may be used solely or two or more thereof may be used jointly. As to a copolymerizing ratio of the polycarboxylic acid as such, it is preferred to be 5 molar % or less, more preferred to be 2 molar % or less, further preferred to be 1 molar % or less, and it may also be even 0 molar %, when the total of the polycarboxylic acid components is taken as 100 molar %.

As to the polyhydric alcohol components of the crystalline polyester resin (A), a 1,4-butanediol component is copolymerized. It is necessary that a copolymerizing ratio thereof is 40 molar % or less when the total of the polyhydric alcohol component is taken as 100 molar %. It is preferred to be 35 molar % or less, and more preferred to be 30 molar % or less. When it is too much, the crystallinity may become strong whereby a solidifying rate may become quick and the fluidity may become bad. Moreover, in such a use which requires the flame-retardant property, there is a tendency that the flame-retardant property lowers since a combustible gas is generated upon burning. The copolymerizing ratio of the 1,4-butanediol component is preferred to be 5 molar % or more, more preferred to be 10 molar % or more, and further preferred to be 20 molar % or more. When it is too small, the crystallinity may not be sufficiently expressed, whereby a tackiness may be generated or a mechanical strength may lower. Moreover, a poor molding may be induced and accordingly a takt time may become long.

It is preferred that a 1,4-cyclohexanedimethanol component is copolymerized as the polyhydric alcohol components of the crystalline polyester resin (A). As a result of the copolymerization of the 1,4-cyclohexanedimethanol component, the melt viscosity of the crystalline polyester resin (A) can be suppressed to be low and a flame-retardant sealing resin composition having the good fluidity can be prepared. The copolymerizing ratio of the 1,4-cyclohexanedimethanol component is preferred to be 60 molar % or more, more preferred to be 65 molar % or more, and further preferred to be 70 molar % or more when the total of the polyhydric alcohol components is taken as 100 molar %. When it is too small, the melt viscosity of the crystalline polyester resin (A) may become high and accordingly the fluidity may become low. Further, it is preferred to be 80 molar % or less. When it is too much, the crystallinity may not be sufficiently expressed, whereby the tackiness may be generated or the mechanical strength may lower. Moreover, the poor molding may be induced and accordingly the takt time may become long.

As to other polyhydric alcohol component, a glycol component other than the above 1,4-butanediol component and 1,4-cyclohexanedimethanol component and a trivalent or higher polyalcohol component can be copolymerized. As to other glycol component, there may be exemplified an aliphatic glycol such as ethylene glycol, diethylene glycol, propylene glycol, 1,3-propanediol, 1,2-butylene glycol, 1,3-butylene glycol, 2,3-butylene glycol, 1,5-pentanediol, 1,6-hexanediol, 3-methyl-1,5-pentanediol, 2-methyl-1,5-pentanediol, 2-methyl-1,3-propanediol, 2-ethyl-1,3-propanediol, neopentyl glycol, 2-ethyl-2-methyl-1,3-propanediol, 2,2-diethyl-1,3-propanediol, 2-methyl-2-n-butyl-1,3-propanediol, 2-n-butyl-2-ethyl-1,3-propanediol, 2,2-di-n-butyl-1,3-propanediol, 2-ethyl-2-n-hexyl-1,3-propanediol, 2,2-di-n-hexyl-1,3-propanediol, 1,9-nonanediol, 1,10-decanediol and 1,12-dodecanediol; an aromatic glycol such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl) sulfone, bis(p-hydroxyphenyl)-methane, 1,2-bis(p-hydroxyphenyl)ethane, bisphenol A and an adduct of bisphenol A with alkylene oxide; and an alicyclic glycol such as 1,2-cyclohexanediol, 1,3-cyclohexanediol, cis 1,4-cyclohexanediol, 1,2-cyclohexanedimethanol, 1,3-cyclohexanedimethanol, 1,4-cyclohexanedimethanol and 1,4-cyclohexanediethanol. Among them, ethylene glycol, 1,3-propanediol or neopentyl glycol is preferred in view of a heat resistance, a polymerizing ability, a molding ability, a cost, etc. Incidentally, when ethylene glycol is used as the glycol component, it may happen, in a production of the crystalline polyester resin (A), that diethylene glycol is by-produced to give a copolymerizing component. Further, as to the trivalent or higher polyalcohol component, there may be exemplified trimethylolethane, trimethylolpropane, glycerol and pentaerythritol. Each of those glycol components or trivalent or higher polyhydric alcohol components may be used solely or two or more thereof may be used jointly. As to the copolymerizing ratio of the polyhydric alcohol components as such, it is preferred to be 5 molar % or less, more preferred to be 2 molar % or less, further preferred to be 1 molar % or less, and it may also be even 0 molar %, when the total of the polyhydric alcohol components is taken as 100 molar %.

Moreover, a dicarboxylic acid component or a glycol component containing a sulfonic acid metal salt group such as 5-sulfoisophthalic acid, 4-sulfonaphthalene-2,7-dicarboxylic acid, 5-[4-sulfophenoxy]-isophthalic acid and an alkali metal salt thereof or 2-sulfo-1,4-butanediol, 2,5-dimethyl-3-sulfo-2,5-hexanediol and a metal salt thereof may also be used within a range of 20 molar % or less of the total of the polycarboxylic acid components or the total of the polyhydric alcohol components.

As a polyhydric alcohol component for the crystalline polyester resin (A), a polyalkylene ether glycol component may be also copolymerized. The copolymerizing ratio thereof is preferred to be 1 molar % or more, more preferred to be 2 molar % or more, and further preferred to be 3 molar % or more, and also preferred to be 30 molar % or less, more preferred to be 20 molar % or less, and further preferred to be 10 molar % or less, when the total of the polyhydric alcohol components is taken as 100 molar %. As a result of the copolymerization of the polyalkylene ether glycol component, a glass transition temperature of the crystalline polyester resin (A) becomes low whereby an improvement of the flexibility and the fluidity can be expected. However, if the copolymerizing ratio is too large, the flame-retardant property tends to lower because a combustible gas is generated during burning in a use which requires the flame-retardant property. Here, the polyalkylene ether glycol component stands for a general name for triethylene glycol, polyethylene glycol, polytrimethylene glycol, polytetramethylene glycol, polypropylene glycol, etc.

In the present invention, a crystallinity stands for the fact that, when a temperature of a resin is raised from −130° C. to 250° C. at a rate of 20° C./minute using a differential scanning calorimeter (DSC), a clear heat melting peak is noted during a process of temperature raising. When a polyester resin has the crystallinity, an enhancement of the heat resistance and the mechanical characteristics can be expected.

As to a catalyst used in a production of the crystalline polyester resin (A), it is preferred to use at least one compound selected from a group consisting of Ge, Sb, Ti, Al, Mn and Mg although there is no particular limitation therefor. Those compounds may be added to a reaction system as, for example, a powder, an aqueous solution, a solution in ethylene glycol, a slurry in ethylene glycol, etc.

In addition, a stabilizer may be added to the crystalline polyester resin (A) within such an extent that effects of the present invention are not deteriorated thereby. As a stabilizer, it is preferred to use at least one phosphorus compound selected from a group consisting of phosphoric acid, polyphosphoric acid, phosphate such as trimethyl phosphate, phosphoric acid compound, phosphinic acid compound, phosphine oxide compound, phosphonous acid compound, phosphinous acid compound and phosphine compound other than the flame-retardant agent (B).

An acid value of the crystalline polyester resin (A) is preferred to be from 1 to 40 eq/ton, more preferred to be from 2 to 30 eq/ton, and further preferred to be from 3 to 20 eq/ton. When the acid value exceeds 40 eq/ton, a resistance to light may lower. When the acid value is less than 1 eq/ton, a polycondensation reactivity may lower and a productivity may become bad.

A number-average molecular weight of the crystalline polyester resin (A) is preferred to be 5,000 or more, more preferred to be 10,000 or more, and further preferred to be 15,000 or more. When it is too small, the mechanical strength may not be maintained. It is also preferred to be 50,000 or less, more preferred to be 40,000 or less, and further preferred to be 30,000 or less. When it is too large, the melt viscosity may become high.

A melting point of the crystalline polyester resin (A) is preferred to be 100° C. or higher, more preferred to be 110° C. or higher, and further preferred to be 120° C. or higher. When it is too low, the heat resistance may lower. In addition, it is preferred to be 180° C. or lower, more preferred to be 160° C. or lower, and further preferred to be 140° C. or lower. When it is too high, it is necessary to apply a high heat during a sealing process whereby an aging by heat may be promoted.

A glass transition temperature of the crystalline polyester resin (A) is preferred to be −50° C. or higher, more preferred to be −40° C. or higher, and further preferred to be −30° C. or higher. When it is too low, mechanical characteristics and a resin strength may lower at a high temperature. In addition, it is preferred to be 10° C. or lower, more preferred to be 0° C. or lower, and further preferred to be −10° C. or lower. When it is too high, the mechanical characteristics may lower at a low temperature environment.

A reduced viscosity (dl/g) of the crystalline polyester resin (A) is preferred to be 0.2 or more, more preferred to be 0.3 or more, and further preferred to be 0.4 or more. In addition, it is preferred to be 1.0 or lower, more preferred to be 0.8 or lower, and further preferred to be 0.7 or lower. Within the above range, the mechanical characteristics and the fluidity of the resin are expected to be well balanced.

A melt viscosity (dPa·s) of the crystalline polyester resin (A) at 220° C. is preferred to be 500 or lower, more preferred to be 400 or lower, and further preferred to be 300 or lower. Although a lower limit thereof is not particularly limited, it is sufficient to be 10 in an industrial case. Within the above range, it is possible to prepare a sealing resin composition having a good fluidity to be used as a sealing material for molding.

Since the crystalline polyester resin (A) of the present invention exhibits a high melting point and a high fluidity, it can be advantageously used as a hotmelt sealing material. Particular, it can be advantageously used as a hotmelt sealing material for electric/electronic parts.

<Flame Retardant Agent (B)>

A flame retardant agent (B) is compounded for enhancing a flame-retardant property of a flame-retardant resin composition. Although there is no particular limitation for the flame retardant agent (B), it is preferably a phosphorus flame retardant agent of a non-halogen type containing phosphorus atom in a structure, more preferably a flame retardant agent of a phosphate type, still more preferably a phosphate or a metal phosphinate and, particularly preferably, a metal phosphinate. To be more specific, there may be exemplified aluminum tris(diethylphosphinate), bisphenol A bis(diphenyl phosphate), triarylisopropyl phosphate, cresyl di-2,6-xylenylphosphate and an aromatic fused phosphate.

A content of the phosphorous in the flame retardant agent (B) is preferred to be 10% by weight or more, more preferred to be 15% by weight or more, and further preferred to be 20% by weight or more. In addition, it is preferred to be 40% by weight or less, more preferred to be 30% by weight or less, and further preferred to be 25% by weight or less. Within the above range, it is possible to express an excellent flame-retardant property while still maintaining a good fluidity.

A degrading temperature of the flame retardant agent (B) is preferred to be 250° C. or higher, more preferred to be 280° C. or higher, and further preferred to be 300° C. or higher. Within the above range, an excellent flame-retardant property can be expected.

As to other flame retardant agents and auxiliary flame retardant agents, there are exemplified melamine cyanurate, red phosphorous, a compound of a nitrogen-containing phosphoric acid type, a compound of a hydrotalcite type and an alkali compound. The compound of a nitrogen-containing phosphoric acid type includes a reaction product of melamine or a melamine condensate (such as melame, meleme or melone) with polyphosphoric acid or a mixture thereof. There is no problem even when each of those flame retardant agents and auxiliary flame retardant agents is used solely or jointly with a flame retardant agent (B).

<Flame-Retardant Sealing Resin Composition>

The flame-retardant sealing resin composition of the present invention contains the above crystalline polyester resin (A) and flame retardant agent (B). In the flame-retardant sealing resin composition, it is preferred that W(A)/W(B) is 3 or more, more preferred to be 4 or more, and further preferred to be 5 or more, when a weight fraction of the crystalline polyester resin (A) is taken as W(A) and a weight fraction of the flame retardant agent (B) is taken as W(B). When W(A)/W(B) is less than 3, physical properties of the crystalline polyester resin (A) such as a fluidity upon melting and mechanical characteristics may lower. In addition, it is preferred that W(A)/W(B) is 20 or less, more preferred to be 15 or less, and further preferred to be 10 or less. When it exceeds 20, a flame-retardant property may lower.

In the flame-retardant sealing resin composition of the present invention, it is preferred that a sum of the weight fraction W(A) of the crystalline polyester resin (A) and the weight fraction W(B) of the flame-retardant agent (B) in a total weight of the flame-retardant sealing resin composition is 50% by weight or more, more preferred to be 60% by weight or more. When it is too small, the flame-retardant sealing resin composition may not express a fluidity and a flame-retardant property. In addition, it is preferred to be 90% by weight or less, more preferred to be 80% by weight or less. When it is too large, a adhesive property may lower.

A melt viscosity (dPa·s) of the flame-retardant sealing resin composition at 220° C. is preferred to be 1500 or lower, more preferred to be 1000 or lower, and further preferred to be 500 or lower. Although a lower limit thereof is not particularly limited, it is sufficient to be 10 in an industrial case. Within the above range, it is possible to prepare a flame-retardant sealing resin composition having a good fluidity.

Since the flame-retardant sealing resin composition of the present invention exhibits an excellent fluidity and an excellent flame-retarding property, it can be advantageously used as a flame-retardant hotmelt sealing material. Particular, it can be advantageously used as a hotmelt sealing material for electric/electronic parts.

When the crystalline polyester resin (A) or the flame-retardant sealing resin composition of the present invention is exposed for a long period, it is preferred to add an antioxidant thereto within such an extent that the effects of the present invention are not deteriorated thereby. As to the preferred antioxidant, there may be exemplified that of a hindered phenol type such as 1,3,5-tris(3,5-di-t-butyl-4-hydroxybenzyl) isocyanurate, 1,1,3-tri(4-hydroxy-2-methyl-5-t-butylphenyl) butane, 1,1-bis(3-t-butyl-6-methyl-4-hydroxyphenyl) butane, 3,5-bis(1,1-dimethylethyl)-4-hydroxybenzene propanoic acid, pentaerythrityl tetrakis(3,5-di-t-butyl-4-hydroxyphenyl) propionate, 3-(1,1-dimethylethyl)-4-hydroxy-5-methylbenzene propanoic acid, 3,9-bis[1,1-dimethyl-2-[(3-t-butyl-4-hydroxy-5-methylphenyl)propionyloxy]ethyl]-2,4,8,10-tetraoxospiro[5.5]undecane and 1,3,5-trimethyl-2,4,6-tris(3',5'-di-t-butyl-4'-hydroxybenzyl)benzene; that of a phosphorus type such as 3,9-bis(p-nonylphenoxy)-2,4,8,10-tetraoxa-3,9-diphosphaspiro[5.5]undecane, 3,9-bis(octa-decyloxy)-2,4,8,10-tetraoxa-3,9-diphosphaspiro[5.5]undecane, tri(mononomylphenyl) phosphite, triphenoxyphosphine, isodecyl phosphite, isodecylphenyl phosphite, diphenyl 2-ethylhexylphosphite, dinonylphenyl bis(nonylphenyl) ester phosphorous acid, 1,1,3-tris(2-methyl-4-ditridecyl phosphite)-5-t-butylphenyl) butane, tris(2,4-di-t-butylphenyl) phosphite, pentaerythritol bis(2,4-di-t-butylphenyl phosphite), 2,2'-methylenebis(4,6-di-t-butylphenyl) 2-ethylhexylphosphite and bis(2,6-di-t-butyl-4-methylphenyl) pentaerythritol diphosphite; and that of a thioether type such as 4,4'-thiobis[2-t-butyl-5-methylphenol] bis[3-dodecyl-thio]-propionate, thiobis[2-(1,1-dimethylethyl)-5-methyl-4,1-phenylene] bis[3-(tetradecyl-thio)-propionate], pentaerythritol tetrakis(3-n-dodecylthiopropionate) and bis(tridecyl) thiodipropionate. Each of them may be used solely or jointly by combining them. An adding amount thereof to a total amount of the flame-retardant sealing resin composition is preferred to be from 0.1% by weight to 5% by weight. When it is less than 0.1% by weight, an antioxidant effect may become poor. When it exceeds 5% by weight, a tightly adhering property may be badly affected.

Moreover, when a weather resistance is demanded for the crystalline polyester resin (A) or the flame-retardant sealing resin composition of the present invention, it is preferred to add a light stabilizer thereto. For example, as to a light stabilizer of a benzotriazole type, there may be exemplified 2-(3,5-di-tert-amyl-2'-hydroxyphenyl)benzotriazole, 2-(2-hydroxy-5-tert-octylphenyl)benzotriazole, 2-(2'-hydroxy-3'-tert-butyl-5'-methylpheny)-5-chlorobenzotriazole, 2-(2H-benzotriazol-2-yl)-p-cresol, 2-(2'-hydroxy-5'-methylphenyl)-benzotriazole, 2,4-di-tert-butyl-6-(5-chloro-benzotriazol-2-yl)-phenol and 2-[2-hydroxy-3,5-di(1,1-dimethylbenzyl)]-2H-benzotriazole. They are non-limitative examples and anything may be used appropriately provided that it is a light stabilizer of a benzotriazole type. As to a light stabilizer of a benzophenone type, there may be exemplified 2-hydroxy-4-(octyloxy)benzophenone, 2,4-dihydroxybenzo-phenone, 2-hydroxy-4-methoxybenzophenone, 2-hydroxy-4-methoxybenzophenone-5-sulfonic acid, 2-hydroxy-4-n-dodecyloxybenzophenone, bis(5-benzoyl-4-hydroxy-2-methoxy-phenyl)methane, 2,2'-dihydroxy-4-methoxybenzophenone and 2,2'-dihydroxy-4,4'-dimethoxybenzophenone. They are non-limitative examples and anything may be used appropriately provided that it is a light stabilizer of a benzophenone type. As to a light stabilizer of a hindered amine type, there may be exemplified bis(2,2,6,6-tetramethyl-4-piperidyl) sebacate, a poly-condensate of dimethyl succinate with 1-(2-hydroxyethyl)-4-hydroxy-2,2,6,6-tetramethylpiperidine, poly[{6-(1,1,3,3-tetramethylbutyl)amino-1,3,5-triazin-2,4-diyl}{(2,2,6,6-tetramethyl-4-piperidyl)imino}hexamethylene(2,2,6,6-tetra-methyl-4-piperidyl)imino], 1,3,5-tris(3,5-di-tert-butyl-4-hydroxybenzyl-s-triazine-2,4,6(1H,3H,5H)trione and tris (4-tert-butyl-3-hydroxy-2,6-dimethylbenzyl)-s-triazine-2,4, 6-(1H,3H,5H)trione. They are non-limitative examples and anything may be used appropriately provided that it is a light stabilizer of a hindered amine type. As to a light stabilizer of a nickel type, there may be exemplified [2,2'-thio-bis(4-tert-octyl-phenolate)]-2-ethylhexylamine nickel (II), nickel dibutyl-dithiocarbamate and [2',2'-thio-bis(4-tert-octyl phenolate)] n-butylamine nickel. They are non-limitative examples and anything may be used appropriately provided that it is a light stabilizer of a nickel type. As to a light stabilizer of a benzoate type, there may be exemplified 2,4-di-t-butylphenyl-3,5'-di-tert-butyl-4'-hydroxy benzoate. It is a non-limitative example and anything may be used appropriately provided that it is a light stabilizer of a benzoate type. Each of these light stabilizers may be used solely or jointly by combining them. An adding amount thereof to a total amount of the flame-retardant sealing resin composition is preferred to be from 0.1% by weight to 5% by weight. When it is less than 0.1% by weight, the weather resistance may become poor. When it exceeds 5% by weight, an adhering property may be badly affected.

In addition, in the crystalline polyester resin (A) or the flame-retardant sealing resin composition of the present invention, various known additives may be used within such an extent that the effects of the present invention are not deteriorated thereby. As to the additive, there may be exemplified a shock-improving material, an improving material for slidability, a coloring agent, a plasticizer, a crystal nucleating agent and a thermoplastic resin other than polyester.

A crystal nucleating agent may be added to the crystalline polyester resin (A) or the flame-retardant sealing resin composition of the present invention. Transparency can be enhanced when 0.01 to 5 part(s) by weight of the crystal nucleating agent is added to 100 parts by weight of the crystalline polyester resin (A). The crystal nucleating agent has such an effect that a crystallizing rate of the crystalline polyester resin (A) is increased whereby a crystallization can be finished quickly and simultaneously that numbers of crystal nuclei are adjusted whereby a size of the spherical crystals can be controlled as well. As to specific examples of the crystal nucleating agent, there may be exemplified inorganic fine particles such as talc, silica, graphite, carbon powder, pyroferrite, gypsum and neutral clay; metal oxide such as magnesium oxide, aluminum oxide and titanium dioxide; and sulfate, phosphate, silicate, oxalate, stearate, benzoate, salicylate, tartrate, sulfonate, montanic acid wax salt, montanic acid wax ester salt, terephthalate, carboxylate and ionic copolymer consisting of $\alpha$-olefin and $\alpha,\beta$-unsaturated carboxylic acid. Among them, metal salts such as zinc salt, calcium salt, magnesium salt, sodium salt and lithium salt of a fatty acid such as hexanoic acid, lauric acid, stearic acid or montanic acid are preferred because they can easily adjust the crystallizing rate. Moreover, when sodium salt of fatty acid is used, the control of the spherical crystal size becomes particularly easy whereby a transparent molded product is easily prepared.

A thermoplastic resin being different from the crystalline polyester resin (A) may be added to the crystalline polyester resin (A) or the flame-retardant sealing resin composition of the present invention within such an extent that the effects of the present invention are not deteriorate thereby. As to examples thereof, there may be exemplified polyamide (PA), polyphenylene sulfide (PPS), liquid crystal polymer (LCP), polytetrafluoroethylene (PTFE), fluorine resin, aramid resin, polyether ether ketone (PEEK), polyether ketone (PEK), polyether imide (PEI), thermoplastic polyimide, polyamide imide (PAI), polyether ketone ketone (PEKK), polyphenylene ether (PPE), polyether sulfone (PES), polysulfone (PSU), polyarylate (PAR), polycarbonate (PC), polyoxymethylene (POM), polypropylene (PP), polyethylene (PE), polymethylpentene (TPX), polystyrene (PS), poly(methyl methacrylate), an acrylonitrile-styrene copolymer (AS) and an acrylonitrile-butadiene-styrene copolymer (ABS). Although the thermoplastic resin as such may be blended in a melted state by means of a melt kneading, it is also possible that the thermoplastic resin in a form of fiber or particles is dispersed into the crystalline polyester resin (A) of the present invention. As to an adding amount of the thermoplastic resin, an optimum amount may be selected. It is possible to add an amount of up to 50 parts by weight thereof to 100 parts by weight of the crystalline polyester resin (A).

The crystalline polyester resin (A) or the flame-retardant sealing resin composition of the present invention can be produced by compounding each of the above-mentioned components by a known method. For example, there may be exemplified a method wherein each of the components is added during a polycondensation reaction of the crystalline polyester resin (A), a method wherein the crystalline polyester resin (A) and other components are subjected to a dry blending, and a method wherein each of the components is subjected to a melt kneading using an extruder of a biaxial screw type.

As to a method for determining a composition and a composition ratio of the crystalline polyester resin (A), there may be exemplified $^1$H-NMR and $^{13}$C-NMR wherein the crystalline polyester resin (A) is dissolved in a solvent such as heavy chloroform and the measurement is conducted. There may be also exemplified methods such as a quantitative determination by gas chromatography being measured after methanolysis of the crystalline polyester resin (A) (hereinafter, it will be sometimes abbreviated as a methanolysis-GC method), a measurement of an acid value (AC) of the crystalline polyester resin (A), and a measurement of a melting point (Tm) and a glass transition temperature (Tg) by DSC. In the present invention, the composition and the composition ratio shall be determined by $^1$H-NMR when there is a solvent which can dissolve the crystalline polyester resin (A) and is also suitable for the $^1$H-NMR measurement. When there is no suitable solvent or when the composition ratio cannot be specified only by means of the $^1$H-NMR measurement, then the $^{13}$C-NMR or the methanolysis-GC, the acid value measurement, the melting point measurement or glass transition temperature measurement by DSC shall be adopted or used jointly.

EXAMPLES

Examples and Comparative Examples will be mentioned hereinafter for illustrating the present invention in more detail but the present invention shall be never limited by those Examples. Incidentally, each of measured values mentioned in Examples and Comparative Examples is measured by the following methods. In Examples, "part(s)" means "part(s) by weight" and "%" means "% by weight".

<Measurement of Reduced Viscosity of Crystalline Polyester Resin (A)>

A sample (0.1±0.005 g) of the crystalline polyester resin (A) and phenol tetrachloroethane are placed in a 25-ml volumetric flask and dissolved by heating to prepare 25 ml of a solution. The prepared sample solution is placed in a viscosity tube and placed into a water tank of 30° C. for 15 to 20 minutes so as to adjust a temperature of the sample solution 30° C. As soon as the predetermined temperature is achieved, a dropping time in seconds is measured while confirming a marked line of the viscosity tube. The reduced viscosity is calculated based on a difference from a dropping time in seconds of a blank. The calculation formula is shown in Formula 1.

{(The dropping time in seconds of the sample solution)−(The dropping time in seconds of the blank)}/(The dropping time in seconds of the blank)/(The weight of polyester resin×4)    Formula 1:

<Measurement of Number-Average Molecular Weight of Crystalline Polyester Resin (A)>

A sample (0.0050 g) of the crystalline polyester resin (A) is dissolved in 5 ml of chloroform by heating. After that, the solution is filtered through a membrane filter so as to remove insoluble matters. The filtrate (sample solution) (80 μl) is measured by a GPC "EZChrom Elite for Hitachi" (manufactured by Hitachi High-Tech Fielding Corporation) to determine the number-average molecular weight.

As to a standard substance, a polystyrene solution is prepared and is used as a sample for GPC calibration curve.

<Acid Value>

A sample (0.1 g) of the crystalline polyester resin (A) is dissolved in 10 ml of benzyl alcohol by heating. After that, its acid value is determined by means of a titration using a 0.1N solution of NaOH in methanol/benzyl alcohol (in a ratio of 1/9 by volume).

<Measurement of Melting Point and Glass Transition Temperature>

In a differential scanning calorimeter "DSC type 220" manufactured by Seiko Electronic Industry, a sample to be measured (the crystalline polyester resin (A)) (5 mg) is placed in an aluminum pan and tightly sealed by pushing the cover. After that, it is once held for 5 minutes at 250° C., then quickly cooled using liquid nitrogen. After that, a measurement is conducted in a temperature-rising rate of 20° C./min from −130° C. to 250° C. As shown in FIG. 1, a crossing point of a tangent (1) and a tangent (2) is adopted as a glass transition temperature, wherein the tangent (1) is obtained from a base line before an inflection point in a part wherein the inflection point is noted in the DDSC, and the tangent (2) is obtained from a base line after the inflection point. A minimum point (a mark x in the drawing) of an endothermic peak is adopted as a melting point.

<Melting Property (Fluidity) Test>

Method for evaluating melt viscosity of crystalline polyester resin (A) and flame-retardant sealing resin composition:

In a flow tester (CFT-500C type) manufactured by Shimadzu, the crystalline polyester resin (A) or the flame retardant sealing resin composition dried to an extent of 0.1% or less water content is filled into a cylinder in the center of a heating body set at 220° C. After one minute from the filling, a load is applied to the sample via a plunger and the melted sample is extruded with the pressure of 1 MPa from a die (pore size: 1.0 mm; thickness: 10 mm) at a bottom of the cylinder. A descending distance and a descending time of the plunger are recorded to calculate the melt viscosity.

Criteria for Evaluation:

[Crystalline Polyester Resin (A)]

oo: 300 dPa·s or less (measuring temperature: 220° C.)

o: more than 300 dPa·s and 400 dPa·s or less (measuring temperature: 220° C.)

Δ: more than 400 dPa·s and 500 dPa·s or less (measuring temperature: 220° C.)

x: more than 500 dPa·s (measuring temperature: 220° C.)

[Flame-Retardant Sealing Resin Composition]

oo: 500 dPa·s or less (measuring temperature: 220° C.)

o: more than 500 dPa·s and 1000 dPa·s or less (measuring temperature: 220° C.)

Δ: more than 1000 dPa·s and 1500 dPa·s or less (measuring temperature: 220° C.)

x: more than 1500 dPa·s (measuring temperature: 220° C.)

When the melt viscosity is too high, the fluidity lowers during a sealing process of electric/electronic parts whereby the sealing becomes insufficient (short) or a high-pressure molding becomes essential whereby a load is applied to the electric/electronic parts. Moreover, it is impossible to take out many products in a production of molded products, etc. Thus, there is a possibility of affecting bad influences in terms of a production takt.

<Evaluation of Moldability>

A flat plate (100 mm×100 mm×10 mm) consisting of the crystalline polyester resin (A) is molded using a metal mold for flat plate molding and using a low-pressure molding applicator (IMC-18F9 manufactured by Imoto Seisakusho) as an applicator for a hotmelt molding processing. Incidentally, a gate position is arranged at a center of a plane of 100 mm×100 m.

Molding conditions: a resin molding temperature of 220° C., a molding pressure of 3 MPa, a keeping pressure of 3 MPa, a cooling time of 15 seconds and a discharging revolution being set at 50%.

Criteria for Evaluation:

o: completely filled (no short shot is noted)

Δ: filled without short shot but depression is noted x: short shot is noted

<Flame Retardant Property (Flammability) Test>

In accordance with an evaluation method of UL-94, the flame retardant property of a flame-retardant test piece of 1.6 mm thickness is evaluated.

Molding conditions for test piece: By using a vertical injection molding machine (TH40E manufactured by Nissei Jushi), a test piece consisting of a flame retardant sealing resin composition (125 mm×13 mm×1.6 mm) is prepared by means of an injection molding. Conditions for the injection molding are as follows: a resin molding temperature of 200° C., a molding pressure of 25 MPa, a cooling time of 25 seconds and an injection speed of 20 mm/second. After that, by using a Bunsen burner, the test piece is contacted twice to a flame of 2 mm height for 10 seconds each and a sum of a burning time after the flame is departed is measured. This operation is repeated for five times (n=5), and a mean value thereof is calculated.

Criteria for Evaluation:

oo: UL-94 Among five operations, all of them are V-0 o: UL-94 Among five operations, a part of them is/are V-0 and other(s) is/are V-1 or V-2

Δ: UL-94 Among five operations, all of them are either V-1 or V-2 x: UL-94 Among five operations, a part of them is/are out of a standard (there is/are one or more product(s) out of the standard)

Example 1

<Production Example of Crystalline Polyester Resin (A-1)>

To an inner area of a reactor equipped with a stirrer, a thermometer and a cooler for distillation were added 176 parts by weight of 2,6-naphthalene dicarboxylic acid, 137 parts by weight of 1,4-butanediol, 69 parts by weight of 1,4-cyclohexane dimethanol and 0.1 part by weight of tetrabutyl titanate. An esterification reaction was conducted at 170 to 220° C. for two hours. After that, 46 parts by weight of dimer acid was added and an esterification reaction was conducted at 200 to 230° C. for two hours. After finishing the esterification reaction, the temperature was raised up to 255° C. and, on the other hand, a pressure in an inner area of a system was gradually reduced down to 665 Pa at 255° C. within 60 minutes. Then, a polycondensation reaction was further conducted at 133 Pa or lower for 30 minutes so as to give a crystalline polyester resin (A-1). Table 1 shows a reduced viscosity, an acid value, a melting point, a number-average molecular weight, a glass transition temperature, a melt viscosity and a result of evaluation for moldability of the resulting crystalline polyester resin (A-1).

Examples 2 to 12

<Production Examples of Crystalline Polyester Resins (A-2 to A-12)>

Crystalline polyester resins (A-2 to A-12) were synthesized by a process similar to Example 1, except that material types and compounding ratios were modified as mentioned in Table 1.

Comparative Examples 1 to 9

<Production Examples of Crystalline Polyester Resins (A-13 to A-21)>

Crystalline polyester resins (A-13 to A-21) were synthesized by a process similar to Example 1. Table 1 shows a composition, physical properties and a result of evaluation for moldability of each of these resins.

TABLE 1

| | | Examples | | | | | |
|---|---|---|---|---|---|---|---|
| | | 1 | 2 | 3 | 4 | 5 | 6 |
| | crystalline polyester resin | A-1 | A-2 | A-3 | A-4 | A-5 | A-6 |
| composition (molar %) | 2,6-naphthalenedicarboxylic acid | 90 | 60 | 40 | 60 | 60 | 100 |
| | terephthalic acid | | | | | | |
| | dimer acid | 10 | 40 | 60 | 40 | 40 | |
| | 1,4-butanediol | 40 | 40 | 40 | 20 | 5 | 20 |
| | 1,4-cyclohexanedimethanol | 60 | 60 | 60 | 80 | 95 | 80 |
| | PTMG1000 | | | | | | |
| | PTMG2000 | | | | | | |
| | trimellitic acid | | | | | | |
| characteristic properties | reduced viscosity (dl/g) | 0.53 | 0.52 | 0.53 | 0.49 | 0.48 | 0.42 |
| | acid value (eq/t) | 5 | 5 | 7 | 5 | 5 | 5 |
| | number-average molecular weight | 23000 | 23900 | 23300 | 21200 | 20900 | 13900 |
| | Tm (° C.) | 158 | 134 | 126 | 134 | 136 | 140 |
| | Tg (° C.) | −15 | −23 | −38 | −26 | −38 | 30 |
| | melt viscosity @220° C. (dPa·s) | 370 | 286 | 176 | 260 | 299 | 180 |
| | | ○ | ○○ | ○○ | ○○ | ○○ | ○○ |
| | moldability | ○ | ○ | ○ | ○ | ○ | ○ |

| | | Examples | | | | | |
|---|---|---|---|---|---|---|---|
| | | 7 | 8 | 9 | 10 | 11 | 12 |
| | crystalline polyester resin | A-7 | A-8 | A-9 | A-10 | A-11 | A-12 |
| composition (molar %) | 2,6-naphthalenedicarboxylic acid | 100 | 80 | 40 | 60 | 60 | 60 |
| | terephthalic acid | | | 10 | 20 | | |
| | dimer acid | | | 10 | 40 | 40 | 39 |
| | 1,4-butanediol | 20 | 15 | 20 | 20 | 20 | 20 |
| | 1,4-cyclohexanedimethanol | 70 | 85 | 80 | 75 | 70 | 80 |
| | PTMG1000 | 10 | | | 5 | | |
| | PTMG2000 | | | | | 10 | |
| | trimellitic acid | | | | | | 1 |
| characteristic properties | reduced viscosity (dl/g) | 0.64 | 0.45 | 0.45 | 0.67 | 0.55 | 0.5 |
| | acid value (eq/t) | 4 | 8 | 9 | 5 | 6 | 8 |
| | number-average molecular weight | 26700 | 14200 | 14400 | 28100 | 24000 | 22000 |
| | Tm (° C.) | 161 | 148 | 128 | 139 | 150 | 134 |
| | Tg (° C.) | −40 | −19 | −26 | −32 | −45 | −23 |
| | melt viscosity @220° C. (dPa·s) | 398 | 282 | 221 | 495 | 240 | 470 |
| | | ○ | ○○ | ○○ | Δ | ○○ | Δ |
| | moldability | ○ | ○ | ○ | ○ | ○ | ○ |

| | | Comparative Examples | | | | | | | | |
|---|---|---|---|---|---|---|---|---|---|---|
| | | 1 | 2 | 3 | 4 | 5 | 6 | 7 | 8 | 9 |
| composition (molar %) | crystalline polyester resin | A-13 | A-14 | A-15 | A-16 | A-17 | A-18 | A-19 | A-20 | A-21 |
| | 2,6-naphthalenedicarboxylic acid | | 100 | 90 | 30 | 60 | 30 | 30 | | |
| | terephthalic acid | 71 | | | | | | | 60 | 60 |
| | dimer acid | 29 | | 10 | 70 | 40 | 70 | 70 | 40 | 40 |
| | 1,4-butanediol | | | 60 | 40 | 60 | 60 | 40 | 60 | 20 |
| | 1,4-cyclohexanedimethanol | 100 | 75 | 40 | 60 | 40 | 40 | 60 | 40 | 80 |
| | PTMG1000 | | | | | | | | | |
| | PTMG2000 | | 25 | | | | | | | |
| | trimellitic acid | | | | | | | | | |
| characteristic properties | reduced viscosity (dl/g) | 0.75 | 0.62 | 0.6 | 0.68 | 0.53 | 0.42 | 0.41 | 0.49 | 0.4 |
| | acid value (eq/t) | 3 | 8 | 4 | 8 | 5 | 8 | 8 | 10 | 9 |
| | number-average molecular weight | 38000 | 26500 | 26000 | 28700 | 21000 | 13900 | 13800 | 15300 | 13800 |
| | Tm (° C.) | 176 | 185 | 155 | 126 | 136 | 127 | 126 | 107 | 104 |
| | Tg (° C.) | 27 | −10 | −19 | −33 | −23 | −32 | −33 | −34 | −20 |
| | melt viscosity @220° C. (dPa·s) | 970 | 720 | 560 | 600 | 310 | 189 | 179 | 99 | 87 |
| | | x | x | x | x | ○○ | ○○ | ○○ | ○○ | ○○ |
| | moldability | x | Δ | Δ | Δ | x | x | x | x | x |

Abbreviations used in the table are as follows.

PTMG 1000: Polytetramethylene ether glycol (Number-average molecular weight: 1000), PTMG 2000: Polytetramethylene ether glycol (Number-average molecular weight: 2000)

As will be noted from Table 1, the melt viscosity was low and the moldability was also good in Examples 1 to 12. On the contrary, in Comparative Examples 1 to 9, the melt viscosity was high and the fluidity was bad whereby the moldability was bad.

Examples 13 to 22 and Comparative Examples 10 to 18

The crystalline polyester resin (A) and a flame retardant agent (B) compounded in ratios as mentioned in Tables 2 and 3 were subjected to a melt kneading using a biaxial extruder at a die temperature of 160 to 200° C. so as to give flame-retardant sealing resin compositions. The fluidity and flammability of the resulting flame-retardant sealing resin compositions were evaluated by the methods mentioned separately. Results of the evaluations are as shown in the following Tables 2 and 3.

ity was bad. Accordingly, it was impossible to satisfy all of those characteristic properties.

INDUSTRIAL APPLICABILITY

The crystalline polyester resin of the present invention exhibits a high fluidity while maintaining a high melting point. Accordingly, it is excellent in an environmental reliability and a productivity and is useful as a sealing resin composition particularly for electric/electronic parts.

Further, the flame-retardant sealing resin composition using the crystalline polyester resin of the present invention exhibits a low melt viscosity when sealing the electric/electronic parts, etc. and is excellent in a flame-retardant property. Accordingly, it is useful as a sealing resin composition for electric/electronic parts. Furthermore, the flame-retardant sealing resin composition of the present invention is particularly excellent in the flame-retardant property whereby an ignition and a spread of a fire is suppressed against an electric leakage and an excess current from the electric/electronic parts. Accordingly, the composition is very useful. The sealed electric/electronic parts which are sealed by the flame-retardant sealing resin composition of

TABLE 2

| | | Example 13 | Example 14 | Example 15 | Example 16 | Example 17 | Example 18 | Example 19 | Example 20 | Example 21 | Example 22 |
|---|---|---|---|---|---|---|---|---|---|---|---|
| crystalline polyester resin (A) | type | A-6 | A-6 | A-6 | A-7 | A-1 | A-8 | A-2 | A-4 | A-12 | A-9 |
| | part by mass | 100 | 100 | 100 | 100 | 100 | 100 | 100 | 100 | 100 | 100 |
| flame retardant agent (B) | | 5 | 1 | 40 | 30 | 15 | 20 | 20 | 20 | 20 | 15 |
| Tm (° C.) | | 164 | 164 | 164 | 160 | 158 | 148 | 134 | 134 | 134 | 128 |
| Tg (° C.) | | 30 | 30 | 30 | −26 | −15 | −19 | −23 | −26 | −23 | −26 |
| flame-retardant property | | ○○ | Δ | ○○ | ○○ | ○ | ○○ | ○○ | ○○ | ○○ | ○ |
| fluidity @220° C. (dPa · s) | | 646 | 590 | 1468 | 960 | 555 | 423 | 490 | 533 | 1441 | 422 |
| | | ○ | ○ | Δ | ○ | ○ | ○○ | ○○ | ○ | Δ | ○○ |

TABLE 3

| | | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| crystalline polyester resin (A) | type | A-1 | A-17 | A-17 | A-17 | A-18 | A-19 | A-20 | A-20 | A-21 |
| | part by mass | 100 | 100 | 100 | 100 | 100 | 100 | 100 | 100 | 100 |
| flame retardant agent (B) | | | 40 | 10 | 20 | 20 | 60 | 20 | | 30 |
| Tm (° C.) | | 158 | 160 | 155 | 136 | 127 | 126 | 160 | 107 | 104 |
| Tg (° C.) | | −15 | −65 | −19 | −23 | −32 | −33 | 160 | −34 | −20 |
| flame-retardant property | | x | ○○ | x | x | x | ○○ | x | x | x |
| fluidity @220° C. (dPa · s) | | 370 | 1722 | 723 | 1002 | 633 | 1553 | 599 | 99 | 348 |
| | | ○○ | x | ○ | Δ | ○ | x | ○ | ○○ | ○○ |

The flame retardant agent (B) used in Tables 2 and 3 is Exolit (registered trademark) OP 1240 (manufactured by Clariant).

As will be noted from Tables 2 and 3, the flame-retardant property was good and a rise in the melt viscosity could be suppressed in Examples by an addition of a small amount of a flame retardant agent. On the contrary, in Comparative Examples, it was impossible to guarantee the flame-retardant property by the same adding amount of the flame retardant agent in the same manner. In addition, even when the flame-retardant property could be guaranteed, the fluidthe present invention are useful, for example, as various types of connectors, harnesses or electronic parts to be used in automobiles, communication, computers and electric home appliances or as mold-shaped products of switches and sensors having a printed circuit board.

The invention claimed is:

1. A crystalline polyester resin (A) containing polycarboxylic acid components and polyhydric alcohol components as copolymerizing components, wherein a copolymerizing rate of a 2,6-naphthalenedicarboxylic acid component is from 40 to 100 molar % when a total of the polycarboxylic acid components in the crystalline polyester resin (A) is taken as 100 molar %, wherein a 1,4-butanediol component is copolymerized as a polyhydric alcohol component, wherein a copolymerizing rate of the 1,4-butanediol component is 40 molar % or less when a total of the polyhydric alcohol components is taken as 100 molar %, and wherein a melting point of the crystal is from 100° C. to 180° C.

2. The crystalline polyester resin (A) according to claim 1, wherein a copolymerizing rate of a 1,4-cyclohexanedimethanol component is 60 molar % or more when the total of the polyhydric alcohol components in the crystalline polyester resin (A) is taken as 100 molar %.

3. The crystalline polyester resin (A) according to claim 1, wherein a number-average molecular weight is from 5,000 to 50,000.

4. A flame-retardant sealing resin composition containing the crystalline polyester resin (A) according to claim 1 and a flame retardant agent (B).

5. The flame-retardant sealing resin composition according to claim 4, wherein the flame retardant agent (B) is an ester of phosphoric acid or a metal salt of phosphinic acid.

6. The flame-retardant sealing resin composition according to claim 4, wherein a ratio W(A)/W(B) which is a ratio of a weight fraction W(A) of the crystalline polyester resin (A) to a weight fraction W(B) of the flame retardant agent (B) is from 3 to 20.

7. The flame-retardant sealing resin composition according to claim 4, wherein a sum of the weight fraction W(A) of the crystalline polyester resin (A) and the weight fraction W(B) of the flame retardant agent (B) to a total weight of the flame-retardant sealing resin composition is from 50 to 90% by weight.

* * * * *